United States Patent
Bishop et al.

(10) Patent No.: US 8,944,378 B2
(45) Date of Patent: Feb. 3, 2015

(54) METHOD AND SYSTEM FOR FLEXIBLE SEAT ARRANGEMENT IN AIRPLANES

(75) Inventors: Peter Bishop, Hamburg (DE); Oumarou Sodore, Hamburg (DE)

(73) Assignee: Bishop GmbH Aeronautical Engineers, Hamburg (DE)

( * ) Notice: Subject to any disclaimer, the term of this patent is extended or adjusted under 35 U.S.C. 154(b) by 85 days.

(21) Appl. No.: 13/164,010

(22) Filed: Jun. 20, 2011

(65) Prior Publication Data

US 2011/0309195 A1 Dec. 22, 2011

(30) Foreign Application Priority Data

Jun. 18, 2010 (EP) .................................... 10006353

(51) Int. Cl.
*B64D 13/00* (2006.01)
*B64D 11/06* (2006.01)

(52) U.S. Cl.
CPC .... *B64D 11/0696* (2013.01); *B64D 2011/0644* (2013.01)
USPC .................. 244/118.6; 244/118.5; 244/118.1; 244/122 R

(58) Field of Classification Search
USPC ...................... 244/118.1, 118.5, 122 R, 118.6
See application file for complete search history.

(56) References Cited

U.S. PATENT DOCUMENTS

| | | | |
|---|---|---|---|
| 4,936,527 A * | 6/1990 | Gorges | 244/118.6 |
| 5,178,345 A * | 1/1993 | Peltola et al. | 244/118.6 |

(Continued)

FOREIGN PATENT DOCUMENTS

| | | |
|---|---|---|
| DE | 10 2008 006947 | 8/2009 |
| EP | 2 062 815 | 5/2009 |
| JP | 2 279433 | 11/1990 |

OTHER PUBLICATIONS

European Search Report for EP 10006353.6-2422 dated Dec. 7, 2010.

*Primary Examiner* — Luke Ratcliffe
*Assistant Examiner* — Assres H Woldemaryam
(74) *Attorney, Agent, or Firm* — Alix, Yale & Ristas, LLP

(57) ABSTRACT

The invention provides a method for adapting a seat row arrangement in an airplane in order to set seat row distances, wherein the currently desired pattern of seat row positions is stored in a control device and wherein the seat rows are mounted on seat tracks (4) extending in the longitudinal direction and can be locked therein against longitudinal movements by a locking mechanism (12, 13) associated with each seat row, wherein each seat row whose position is to be changed is, under control of the control device, unlocked by releasing the locking mechanism for the seat row, is moved automatically on its seat tracks to the predetermined position by operating drive means under the control of the control device, and is locked there on the seat tracks by the control device by actuating the locking mechanism, characterized in that at least one cable (6) which is extending in the longitudinal direction along the cabin is driven by a motor to move back and forth in a manner controlled by the control device, each seat row or group of seat rows to be moved is subsequently moved by selectively coupling it to the cable (6) under the control of the control device for controlled time intervals such that the seat row follows the movement of the cable during coupling intervals whereby the movements of the cable integrated over the coupling intervals equal the total movement of the seat row or group of seat rows to the position according to the desired pattern of positions.

12 Claims, 5 Drawing Sheets

(56) References Cited

U.S. PATENT DOCUMENTS

| | | | | |
|---|---|---|---|---|
| 5,383,630 A | * | 1/1995 | Flatten | 244/118.6 |
| 5,611,589 A | * | 3/1997 | Fujii et al. | 296/64 |
| 5,673,973 A | * | 10/1997 | Marechal | 297/452.4 |
| 7,137,594 B2 | * | 11/2006 | Mitchell et al. | 244/118.6 |
| 7,232,094 B2 | * | 6/2007 | Bishop et al. | 244/118.6 |
| 7,565,143 B2 | * | 7/2009 | Takeuchi et al. | 455/431 |
| 8,141,946 B2 | * | 3/2012 | Kramer | 297/217.3 |
| 2004/0036330 A1 | * | 2/2004 | Itami et al. | 297/243 |
| 2006/0102785 A1 | * | 5/2006 | Butt | 244/118.6 |
| 2009/0026827 A1 | | 1/2009 | Bishop et al. | |

* cited by examiner

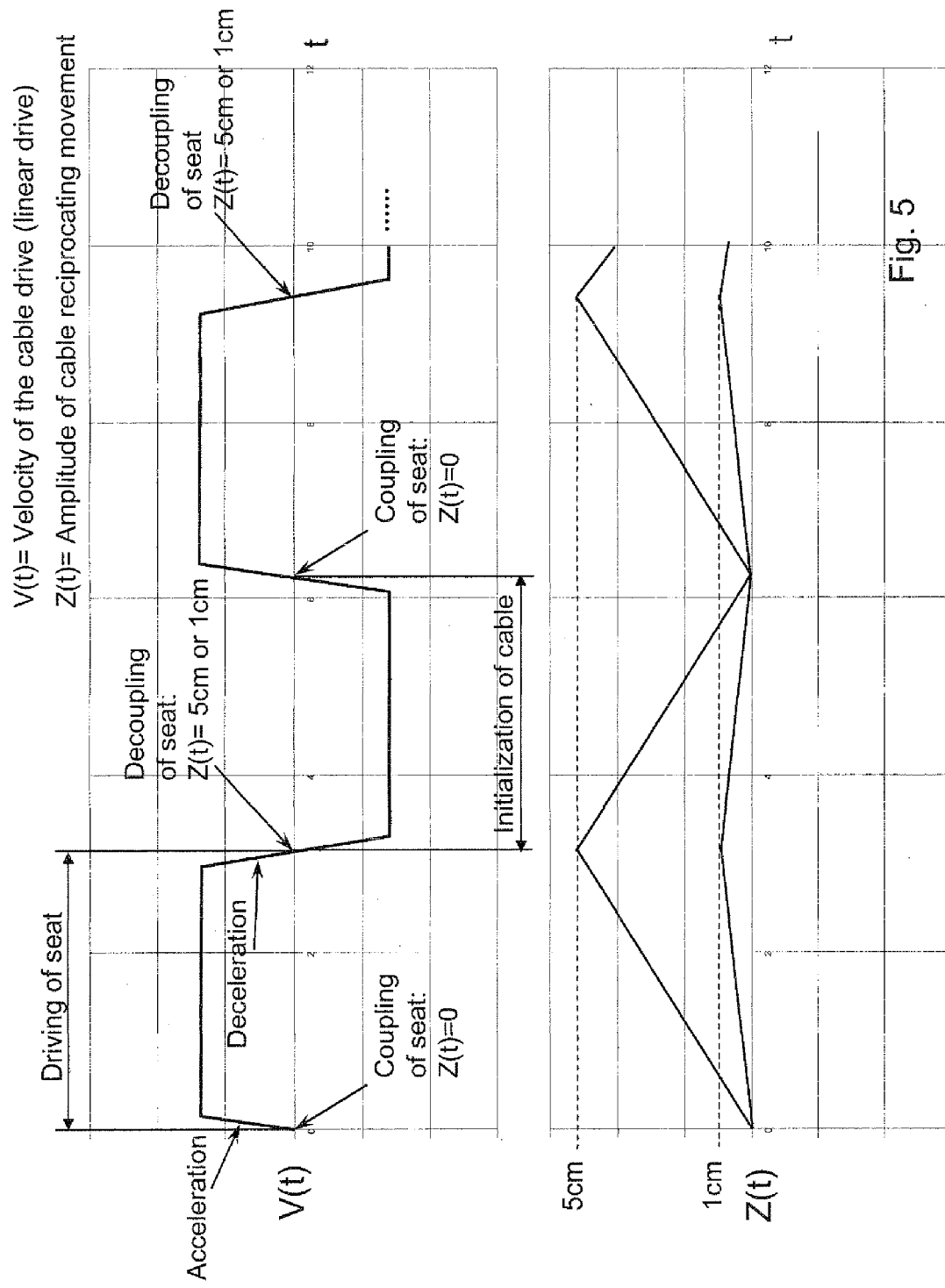

METHOD AND SYSTEM FOR FLEXIBLE SEAT ARRANGEMENT IN AIRPLANES

The present invention relates to a method and a system for adapting a seat row arrangement in an airplane according to a currently desired pattern of seat row positions in the longitudinal direction over a passenger cabin of the airplane in order to set seat row distances, if appropriate differing in some sections of the cabin, wherein the currently desired pattern of seat row positions is stored in a control device and wherein the seat rows are mounted on seat tracks extending in the longitudinal direction in the cabin floor and can be locked therein against longitudinal movements by a locking mechanism associated with each seat row, in which method each seat row whose position is to be changed in order to obtain the currently desired pattern of seat row positions is, under control of the control device, unlocked by releasing the locking mechanism for the seat row, is moved automatically on its seat tracks to the position predetermined by the currently desired pattern of seat row positions by operating drive means under the control of the control device, and is locked there against longitudinal movement on the seat tracks by the control device by actuating the locking mechanism.

In currently operated passenger airplanes the seat rows are mounted on seat tracks which run in the floor of the cabin in the longitudinal direction of the plane. Each seat track comprises an elongated, rectilinear track body having a hollow, longitudinal slide track. The hollow slide track includes a series of equidistant circular receptacle sections serving as attachment holes. Each seat leg is provided with a sledge body for gliding in the slide track and with locking means in the form of tabs projecting from a lower surface of a locking body. By moving the locking body downward and thereby moving the tabs into engagement with attachment holes, the locking means are able to lock the seat leg against longitudinal movements in the seat track. In current airplanes the locking and unlocking of the seat rows in the seat tracks is carried out manually by personal with appropriate tools. The plane operator selects a seat row arrangement which is most favourable for the desired intended purpose. As a rule, at the front of the plane there is a business class section having larger seat row distances, followed by a generally larger section in economy class having smaller seat row distances. Currently the seat row arrangement is changed on rare occasions only if the plane is to be set up, for example, for a new intended purpose and a change in the number of seat rows in business class and economy class is to be brought about. Such changes in the seat row arrangement are carried out only under exceptional circumstances, since they require a high expenditure in terms of personal and time because each seat row whose position is to be changed has to be mechanically released from its fastening on the seat rails by unlocking the locking means, manually displaced and re-fastened. At the same time, if the ratio of seat rows in economy class to seat rows in business class is changed, seat rows are generally brought into the plane or removed therefrom.

On the other hand, under the conditions of today's air traffic, when a passenger plane lands at an airport and, after the shortest possible standing time on the ground, sets off again on the return flight to the original airport or to another airport, situations often arise in which the seat row arrangements with their rigid division into business class and economy class can not be used in an economally favourable manner. For example, flights in the early morning or in the evening are often occupied by a high proportion of business travellers, while flights on the same route in the day are more heavily used by economy class passengers. In this case, if a relatively large section of seat rows is held ready for business class, under flight conditions with a high proportion of economy class passengers, the conveying capacity of the plane is not optimally used; on the other hand, at the peak times of business class use, there is a lack of sufficient seat rows in business class.

In EP 1 480 874 E1, on which the preambles of present claims 1 and 9 are based, these problems are addressed by provision of an automatic flexible seat arrangement system. In particular a method is disclosed in which seat row distances are set in the longitudinal direction in the passenger plane, if appropriate differing in some sections, wherein a currently desired seat row arrangement is stored in a control device, and each seat row whose position is to be changed in order to obtain the currently desired seat row arrangement being moved automatically, under control by the control device, on its seat track to the position predetermined by the currently desired seat row arrangement. The control device is integrated in the avionics system IMA—Integrated Modular Avionics—and the currently desired seat row arrangement for the next flight is transmitted from a logistics centre of the airport by remote data transmission to the passenger plane before it lands and is stored in the control device. In order to achieve the automatic movement of a seat rows to the positions of the currently desired seat row arrangement drive means are disclosed which drive the movement of a seat row along the seat track. For the drive means electric motors are described which are mounted to the seat legs of each seat row and which drive gear wheels which mesh with gear racks provided at the seat tracks. This kind of drive means for obtaining controlled movement of each seat row is disadvantageous in that it requires a large number of electric motors for all seat rows which is very cost intensive. As an alternative, a drive or control cable encircling the cabin floor in the longitudinal direction is proposed. The revolving movement of the control cable is driven by a drive motor. Each seat row to be displaced is, in response to a corresponding control signal, brought into engagement with the drive cable and then pulled by the cable by the desired distance after which it is released again from the drive cable and locked in the seat track. However, simultaneous pulling of several seat rows requires a drive motor of high power. In addition, no precise positioning can be achieved in a single pulling step.

The term "seat row" as used herein does not to refer to all seats which have the same row number. In modern airplanes seats within the same seat row number may be separated by one or more aisles. The term "seat row" as used herein rather refers to seat row elements which may be those seats of the same seat row number disposed between aisles or between an aisle and the inner wall of the cabin. In principle, the term seat row as used herein may also refer to groups of one or more seats having the same seat row number and being located between aisles or between an aisle and an adjacent inner wall of the cabin, i.e. also to seat row elements consisting of an individual seat. Such seat row elements are referred to as seat rows in the present application in order to simplify the wording of the present description.

It is an object of the present invention to provide a method and a system for adapting a seat row arrangement in an airplane with an improved drive mechanism for driving the movement of the seat rows to the desired pattern of seat row positions.

To achieve this object a method as set out in claim 1 and a system as set out in claim 9 are provided.

According to the method of the invention at least one cable which is extending in the longitudinal direction along the cabin is driven by a motor to move back and forth in a manner controlled by the control device. Since the motor which effects the reciprocating movement of the cable is controlled by the control device position information and state of movement information of the cable are available in the control device at all times. In addition sensing means may be provided which sense the position of a reference point of the cable or of a plurality of points along the cable with respect to the seat tracks or to the cabin floor. Each seat row or group of seat rows to be moved is subsequently moved by selectively coupling it to the reciprocating cable under the control of the control device for controlled time intervals. As a result of the coupling the seat row follows the movement of the cable during coupling intervals whereby the total movement of the seat row or group of seat rows equals the movements of the cable integrated in time over the coupling intervals. The coupling intervals are selected by the control device such that the seat row or group of seat rows reaches the position according to the desired pattern of positions.

By comparing the current positions of the seat rows with the desired pattern of positions the control device is able to derive for each seat row a distance of required movement. For each seat row a sequence of coupling intervals is derived such that the integrated movements of the cable over the sequence of coupling intervals result in the required distance for the seat row. In addition, the control device selects a sequence in which seat rows are moved subsequently in such a manner that only a certain number of seat rows are moved simultaneously, for example only one, two or three rows at a time. In this manner the power to be supplied by the motor for the reciprocating movement can be limited. Of course, the sequence of seat movements is to be selected such that the seat rows can not interfere with each other due to their movements.

Preferably the coupling intervals are selected in the control device such that the starting and end points in time of each coupling interval are at the end point of a forward or backward moving cycle or stroke of the reciprocating movement, or in other words at points in time in which the velocity of the cable is zero. In this manner it is guaranteed that the seat row is accelerated in a controlled manner by the reciprocating cable and thus is brought to a predetermined position without any possibility of a slipping movement between the cable and the seat row at the beginning or any possibility of any further gliding movement of the seat row on the seat track after the end of a coupling interval.

The reciprocating movement comprises forward and backward strokes (the stoke length corresponding to the amplitude of the reciprocating movement), one forward and the following backward stroke defining one cycle or one period of the reciprocating movement. The above described adjustment of the coupling intervals implies that the length of a coupling interval in time corresponds to one half of the period of the reciprocating movement, or in other words to one half of its inverse frequency. This also implies that the total movement of a seat row is given by the sum of the amplitudes (or strokes) of the reciprocating movement of the cable over the coupling intervals.

In order to allow a precise positioning it is preferred that the control device derives according to a predetermined algorithm amplitudes (or strokes lengths) and frequencies for the periodical, oscillating back and forth movement such that the sum of the amplitudes over the coupling periods approximates the desired distance of movements as precisely as possible. If for example a seat row has to be moved by 42 cm, the control device can select an amplitude of 5 cm and generate control signals for the drive motor of the cable to carry out a reciprocating movement with a forward movement of 5 cm and a backward movement of 5 cm, wherein 5 subsequent coupling intervals of a half period of the cycle are effected, whereafter the control device reduces the amplitude of the reciprocating movement of the cable to 1 cm and thereafter effects two coupling intervals corresponding to half periods of forward movement of the cable, such that a total movement of 85 cm+21 cm=42 cm is obtained. The pre-programmed algorithm for selecting amplitudes and frequency of the reciprocating movement takes into account the performance characteristics of the motor which drives the reciprocating movement, thus there will be a range of possible amplitudes, for example between 1 and 5 cm, a range of available frequencies, for example 1 to 5 Hz.

Each cable is driven to perform a periodical, oscillating back and forth movement with an adjustable amplitude and frequency which are derived in the control device so that the time dependence of the oscillating movement of the cable and thereby the current position of a reference point on the cable at each point in time is available to the control device. The time dependence of the reciprocating movement can be described by the function $z(t)$, wherein z is the position of the reference point of the cable in the longitudinal direction, or by $v(t)$ which is the velocity of the reference point as a function of time (or in other words the time derivative of the spatial coordinate $v(t)=\dot{z}(t)$). The shape of the function $v(t)$ can be of any predetermined form; since $v(t)$ is generated under the control of the control device, $v(t)$ and $z(t)$ are values available at any point in time t in the control device. The function $v(t)$ could for example be a saw-tooth function with a linear increase of $v(t)$ over one half of the period of the cycle and a linear decrease of $v(t)$ over the second half period of the cycle. Another example for the form of reciprocating movement is a periodically rectangle function, wherein the description as a rectangle function is an approximation because the velocity increase and decrease after a half period of constant velocity is indeed occurs over a very short, but limited rise and fall time and is not occurring instantly as in ideal rectangle functions having vertical increase and decrease portions. However, rectangle functions can be approximated to a reasonable degree in which the rise and fall times are negligibly small compared to the period length of the periodical function. Alternatively, one can also select a certain rise time and fall time with a given slope with a plateau of constant velocity inbetween, and a corresponding shape in the negative direction in the second half period of the cycle. In principle, any other shape of $z(t)$ or $dz(t)/dt$ can be selected implemented in the control device such that the turning points of the reciprocating movements ($dz(t)/dt=0$), the stroke or amplitude of the reciprocating movements etc. are available in the control device which allows the control device to realize coupling intervals coinciding with half periods of the reciprocating movement such that a sequence of incremental movements corresponding to one stroke length for each step may be performed.

Preferably for each seat track a reciprocating cable is provided which is driven to move back a forth in the seat track under the control of the control device. For each leg of a seat row that is slidably mounted on one of the seat tracks a locking mechanism is provided for locking the seat leg against longitudinal movements with respect to the seat track and for unlocking it if movement along the seat track is desired. By providing a cable for each seat track and thereby for each seat leg that is slidably mounted on one of the seat tracks an independent drive for movement of each seat leg can be realised. This is advantageous because there can be situations in which a seat row is not completely aligned with respect to the seat tracks on which it slides but is slightly tilted such that the seat row legs are not precisely oriented along a line transverse to the longitudinal direction of the seat tracks. Under such circumstances an independently driven movement of one seat leg of the seat row can be utilized achieve alignment of the seat row again.

In connection with independently driven legs of a seat row it is preferred that for each driven leg the position relative to attachment holes in the seat track is sensed and transmitted to the control device. The control device is adapted to determine whether the locking mechanism is in alignment with those attachment holes which correspond to the final position of the seat leg according to the desired pattern of seat row positions. The control device is further adapted to actuate, upon determining that alignment with the desired attachment holes is reached, the locking mechanism to lock the seat leg in the seat track. The position with respect to the attachment holes is for example sensed by an optical sensor. The signals of the optical sensor can also be utilized by the control device in order to count the number of attachment holes passed during a particular movement operation of a seat row. By identifying the number of attachment holes to be passed until the final position is reached, the control device is able to identify the attachment hole or attachment holes (in case the locking mechanism enters into engagement with more than one attachment hole, i.e. has at least two pins for engaging at least two attachment holes spaced in longitudinal direct) which correspond to the desired final position according to the desired pattern of position of the particular seat row at issue.

In a preferred embodiment the releasing or unlocking of the locking mechanism to unlock a seat leg from the associated seat track is effected by moving a clutch body upward such that pins projecting from the lower surface of the clutch body are moved out of engagement with attachment holes in the seat track. The upward movement of the clutch body at the same time causes a coupling engagement with the reciprocating cable by moving clamping members attached to the clutch body into engagement with the cable, wherein the engagement is achieved by opposing clamping bodies which engage and clamp the cable between each other.

In a preferred embodiment the signal exchange between the control devices on the one hand and the motors for driving the cable, the locking mechanisms and the coupling mechanisms on the other hand is effected by wireless radio transmission of signals. This requires that the control device is connected to a transceiver and that each driven leg of the seat rows is equipped with a transceiver which is furthermore connected to the associated locking and coupling mechanisms.

In a preferred embodiment the operation is controlled by the control device such that the number of seat rows which are coupled at the same time to one cable to be moved thereby is limited to a predetermined threshold. In this manner it can be ensured that the total power to be supplied by a motor to a cable is limited. In typical schemes which are programmed in the control device, in a first step seat rows in the front row or in two or more foremost rows are moved, whereafter the state of movement of seat rows involved in subsequent moving steps is propagating like a wave from the front to the back end of the cabin.

According to the invention a system for adapting a seat row arrangement in an airplane according to a currently desired pattern of seat row positions in the longitudinal direction over a passenger cabin of the airplane in order to set seat row distances comprises a control device, a plurality of seat rows mounted on seat tracks longitudinally extending in the cabin floor, wherein each leg of a seat row that is mounted on a seat track has a locking mechanism capable of unlocking and locking the seat leg against longitudinal movements in the seat track under the control of the control device, a cable driven by drive means for a reciprocating movement in the longitudinal direction under the control of the control device, at least one coupling mechanism associated with each seat row for selective coupling of the seat row to the cable under the control of the control device, wherein the control device is adapted to perform a method according to the invention.

In a preferred embodiment of the system each locking mechanism includes a clutch body having one or more pins projecting from its lower surface, which pins are arranged to be engageable with attachment holes disposed along each seat track. The clutch body is mounted to be moveable in vertical direction up and down to move the pins out of or into engagement with attachment holes to thereby unlock or lock the associated seat leg in the seat track. The clutch body is further equipped with clamping members being arranged in relation to the associated cable such that the clamping members are out of coupling engagement with the cable when the clutch body of the locking mechanism is in its locked position on the seat track, and that the clamping members are in coupling engagement with the cable when the clutch body is moved upward to an unlocked position with its pins out of engagement with the attachment holes. In this manner the functions of unlocking the seat leg in the seat track and the function of coupling the seat leg to the cable are performed simultaneously by actuating the clutch body to move upward, whereafter the decoupling from the cable and the following locking of the seat leg in the seat track are likewise performed simultaneously by actuating the clutch body to move downwardly.

To drive the cables for the reciprocating movements it is preferred that electric linear motors are provided, for example one at the front end under the floor of the cabin and one at the rear end under the floor of the cabin. The two electric linear motors can drive a single cable extending therebetween or a plurality of cables extending parallel to each other and in the longitudinal direction of the airplane.

The invention will be further describe in connection with preferred embodiments and the accompanying drawings in which FIG. 1 shows a perspective view of a seat track portion with a sledge to be attached to a lack of a seat;

FIG. 5 shows a schematical diagram illustrating the reciprocating movement of the control cable.

Figure 1:
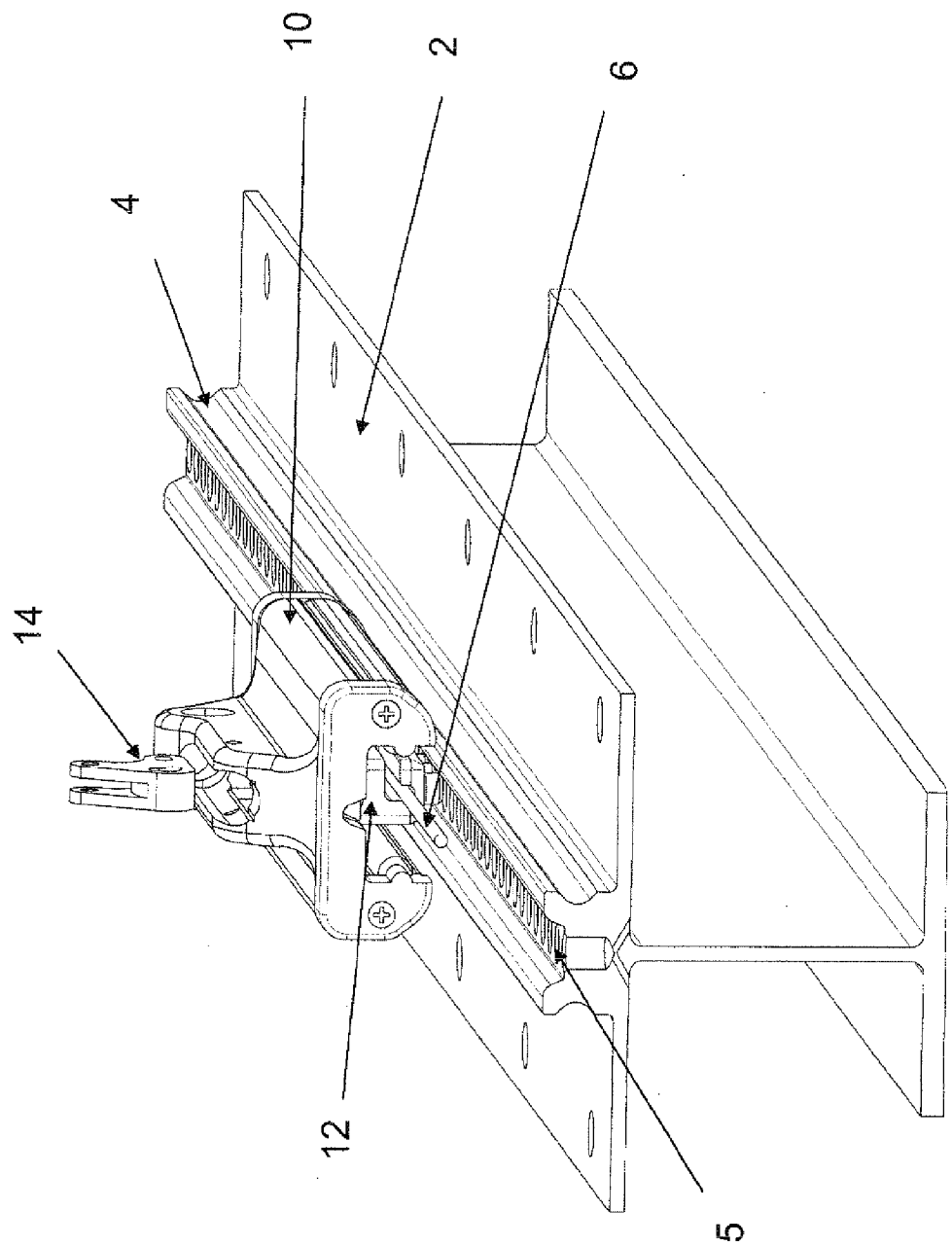
Figure 2:
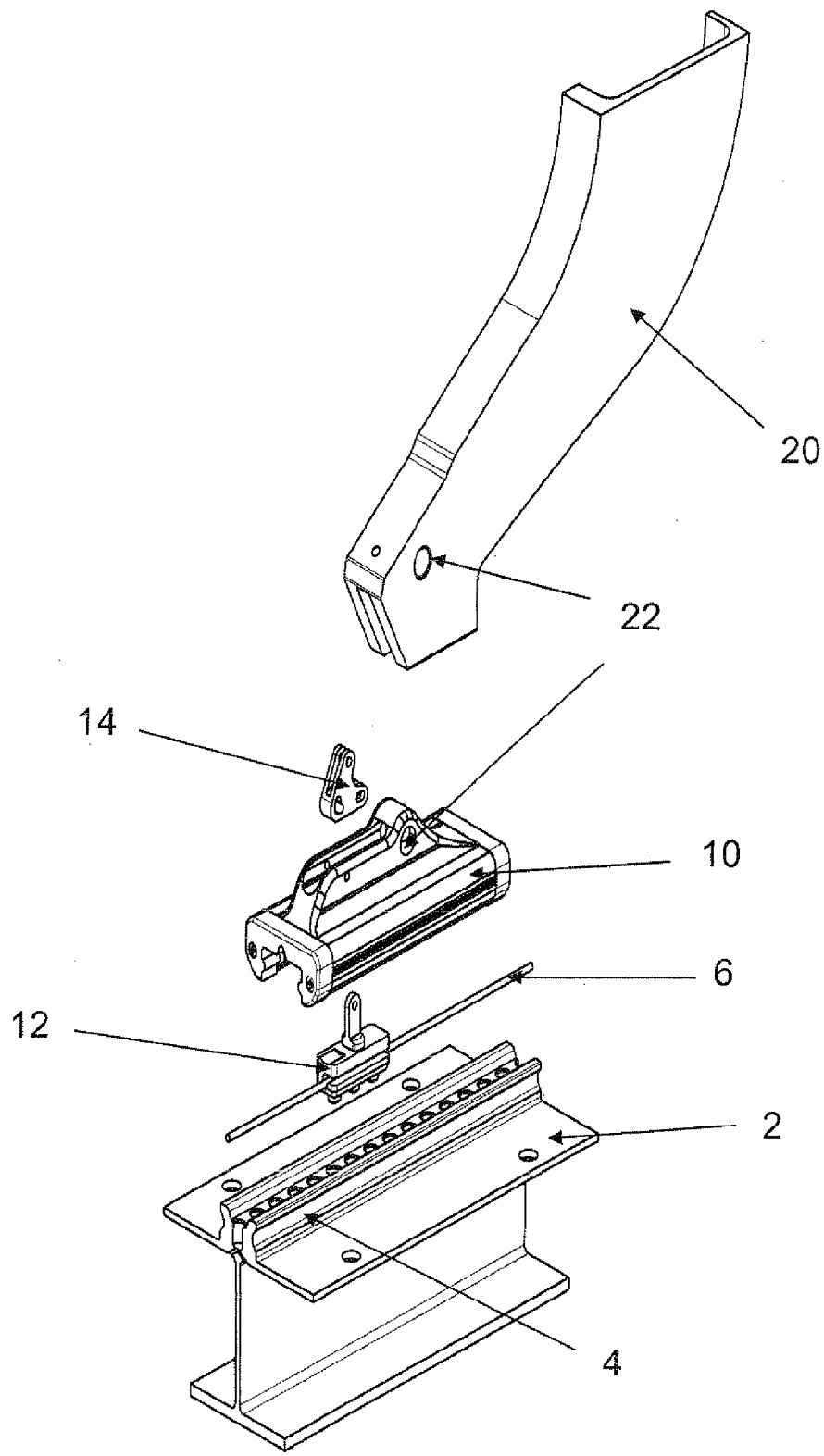
FIG. 2 shows a similar perspective view of a seat track portion in an exploded view with divisional component more separated than in FIG. 1.

For the general description of flexible seat row arrangement systems we refer to EP 1 480 874 B1, and for more details with regard to seat tracks we refer to EP 2 019 037 B1 and EP 2 062 815 B1 of the applicant. EP 1 480 874 B1 describes the framework of a flexible seat arrangement system in which the present invention is preferable utilized. For the present description of the detailed embodiments it is assumed that each seat is provided with four seat legs which in turn are equipped with sledges to be slidably mounted on the seat tracks. Each seat rests on two parallel seat tracks which are fixed in the cabin floor. One example for such seat track is shown in FIG. 1 with reference numeral 2. The seat track 2 is provided with a seat rail 4 on which a sledge 10 is slidably mounted. The sledge 10 in turn is connected to a seat leg 20. Seat leg 20 and sledge 10 are provided with bolting holes 22 for securing the sledge 10 on the seat leg 20.

Figure 3:
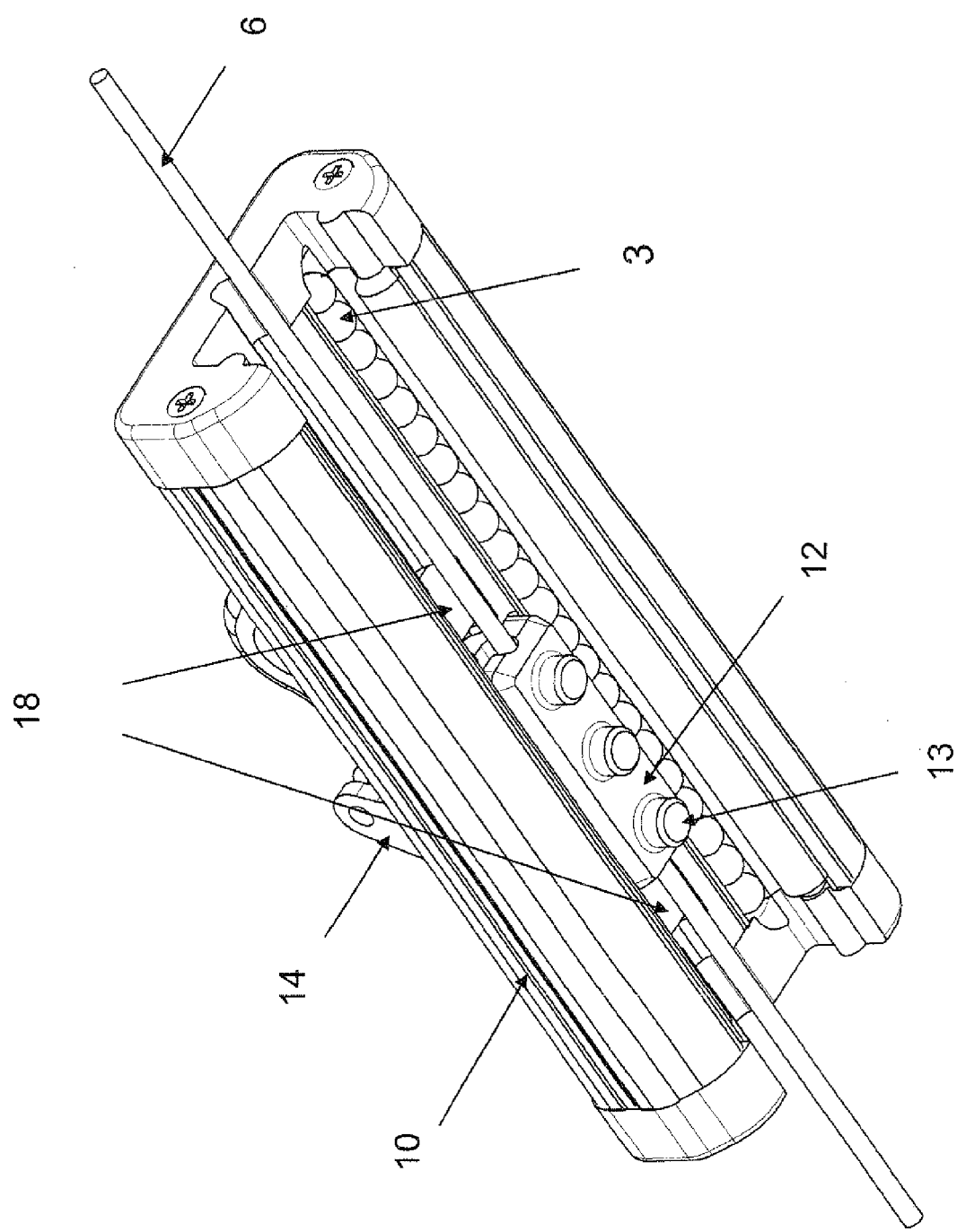
FIG. 3 shows a perspective view of the sledge of a seat lack to be mounted on the seat track.
Figure 4:
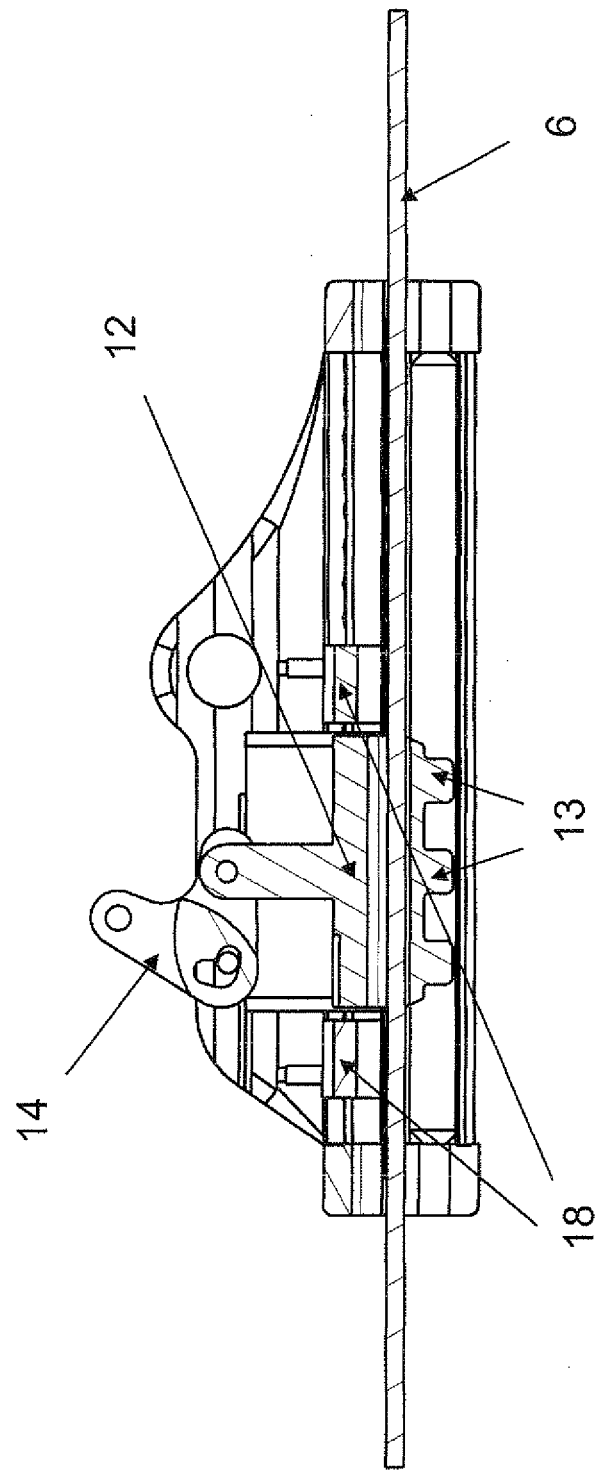
FIG. 4 shows a side sectional view of the sledge of FIG. 3 which is to be mounted on a seat track.

The sledge 10 and the seat rail 4 are in cross section of complementary shape such that the sledge 10 can slide in longitudinal direction with respect to the seat rail 4, but has inner projections which are received in complementary recesses of the seat rail such that the sledge 10 cannot move in vertical direction with respect to the seat rail 4. In the embodiment shown these complementary projections and recesses are formed by two semi-cylindrical projections provided in a hollow channel in the sledge 10 and by corresponding semi-cylindrical recesses or groves in the seat rail. This provides for an engagement against movements in vertical direction of the sledge 10 with respect to the seat rail 4 but allows for longitudinal sliding movement of the sledge 10 along the seat rail 4. The sliding movement of the sledge along the seat rail 4 is in the embodiment shown in FIG. 3 improved by spherical rollers 11 mounted in the hollow channel of the sledge 10, as shown in FIG. 3, which run on planar upper surface portions of the seat rail 4 when the sledge 10 is moving along the seat rail 4.

In the preferred embodiment each seat has in each of the sledges on the rear legs a coupling mechanism which allows to individually couple each rear seat leg to a drive cable 6 which extends in longitudinal direction along the seat rail 4. The drive cable 6 extends through a clutch body 12 in the sledge 10. This clutch body 12 is mounted in the sledge 10 to be vertically moveable therein. This clutch body 12 has a vertically upright extension which is coupled to a lever 14. The lever 14 is furthermore connected to an actuator (not shown) which is controlled by a remote control device controlling and operating the flexible seat arrangement system of the present invention. By actuating the actuator and thereby turning the lever 14 the clutch body 10 is moved upward. By lifting the clutch body 12 pins 13 projecting from the lower surface of the clutch body 12 are moved out of engagement with attachment holes 5 which are formed by equidistant circular receptacle sections provided in each seat rail 4. By moving the clutch body 12 vertically upward and bringing the pins 13 out of engagement with the attachment holes 5 of the seat rail 4 the associated seat leg is brought to an unlocked state in which it is not locked against longitudinal movements along the seat track. By turning the lever 14 through the actuator back again the clutch body 12 with its pins 13 is moved into engagement with attachment holes 5 again to thereby lock the seat leg again. In this embodiment the clutch body 12 with its attachment pins 13, together with the lever 14 and an associated actuator (not shown) form a locking mechanism for locking and unlocking the seat leg against longitudinal movements along the seat track.

In the illustrated embodiment the clutch body 12 is further adapted such that it forms also part of a coupling mechanism which serves to couple the sledge 12 to the movement of the reciprocating cable 6 if desired. The drive cable 6 runs through a hollow channel in the clutch body 12. This hollow channel 12 is provided with clamping bodies 18 made of rubber which are arranged in the hollow channel of the sledge 12 such that they engage the drive cable 6 when the clutch body 12 is moved to its vertical raised position by turning the lever 14. The upward movement of the clutch body 12 lets the rubber clamping bodies 18 in the hollow channel of the clutch body 12 likewise move upward and brings them into engagement with the drive cable 6 which is vertically not moveable. In the moved up state the drive cable 6 is engaged between opposing rubber clamping bodies 18. In this embodiment the vertically moveable clutch body 12 together with lever 14 and its actuator (not shown) also form a coupling mechanism for selectively coupling the seat leg to the drive cable 6.

By integrating the locking and the coupling mechanisms into the vertically moveable clutch body 12 together with its associated lever 14 and actuator, the function of locking/unlocking against longitudinal movements in the seat track (locking mechanism) and the function of simultaneous decoupling/coupling of the seat leg to the drive cable are integrated into the same actuation mechanism. Of course, the relative movement of the pins 13 of the clutch body 12 out of engagement with the attachment holes 5 of the seat track must be coordinated with the movement of the clamping bodies for clamping the clutch body 23 to the drive cable 6 such that the coupling engagement with the drive cable 6 is effected only after the pins 13 have been fully withdrawn from the attachment holes 5 of the seat track. This is achieved by proper relative positioning of the pins 13 with respect to the clamping bodies.

Each actuator at a seat leg that is provided with the described locking and coupling mechanism is connected to a transceiver for receiving and transmitting radio signals. The control device is likewise equipped with a transceiver for receiving signals from any of the transceivers in a seat leg of each seat and for transmitting signals to each seat. The control device can individually address each seat which is identified by a unique IP address; the control device likewise can identify from received signals from which particular seat the signals originated. The control device contains data representing the current positions of all seats, and is capable of receiving a currently desired pattern of seat position which includes a desired position for each seat. On this basis the control device can derive a distance of movement for each seat which needs to be moved to arrive at the desired pattern of seat positions. The control device is arranged with algorithms which derive a sequence movement in order to eventually arrive at the desired pattern of seat positions. For example, the sequence of movements could start with the seats of the first row, thereafter proceed to the second row, third row, etc. In this manner the movement of seats would propagate from seat row to seat row from the front end to the rear end of the cabin. It is also possible that the moving operations of two or more subsequent seat rows overlap, for example moving steps of the second row already start while moving steps of the first row are still underway.

In order to achieve the desired movement the control device operates a motor to move the cables along the seat tracks for a reciprocating movement with an amplitude or stroke and frequency that are variable and selected by the control device. The stroke may for example be in a range from 1 cm to 5 cm, and the frequency in a range of 1 Hz to 5 Hz. The control device operates the motor to let the cables reciprocate, and synchronized with the reciprocating movement of the cables operates the locking mechanism and the coupling mechanism of each seat to be moved in a manner coordinated with the movement of the cables. For a particular seat to be moved the control device operates the actuators at the rear seat legs to move the locking mechanism from its locked state (pins of the clutch body in engagement with the attachment holes of the seat rails) to its unlocked state and then brings the coupling mechanism into coupling engagement with the cable for a controlled coupling interval.

In FIG. 5 the time dependence of the longitudinal position z(t) of a reference point along the cable as well as the corresponding velocity are shown, wherein a little bit more than one and a half periods of the reciprocating movement are illustrated. The cable is driven under the control of the control device such that the velocity v(t) as a function of time approximates a periodical rectangle function, wherein the function deviates from an ideal rectangle function that it has ramps of steep, but finite slope. However, the rise time and the corresponding deceleration time are very short compared to the constant velocity portion. Therefore, the effect of the short acceleration and deceleration phase has been neglected in the lower part of FIG. 5 which shows a linear function for z(t) neglecting the effects of acceleration and deceleration close to the turning points of the reciprocating movement. In reality there would be a small deviation from the linearity of the function z(t) near the beginning and near the end of a stroke; however, this deviation is very small and has been neglected in the lower part of FIG. 5 to simplify the illustration.

The coupling interval is selected by the control device such that coupling to the drive cable starts and ends at points of time in which the velocity of the cable is zero, i.e. at the turning points of forward and backward strokes of the reciprocating movement. This is schematically indicated in FIG. 5 which in the lower part shows the longitudinal position z(t) of a reference point along the cable as a function of time, wherein the cable first is reciprocating with an amplitude of for example 5 cm and wherein a second curve with a lower amplitude of 1 cm is also indicated. The first coupling interval is indicated by an arrow "driving of seat" which extends from one turning point of the oscillating movement to the next, i.e. extends between two points in time at which the velocity of the cable is zero. The velocity of the reference point of the cable is shown in the upper part of FIG. 5. When the velocity is zero and the cable is at rest the coupling mechanism effects coupling to the cable 6 whereafter the coupled seat leg takes part in the movement for one stroke of the reciprocating movement of the cable to the end of the stroke when the velocity of the cable is again zero and the coupling mechanisms of the seat decouples from the cable. In this manner the seat is advanced one step by a distance corresponding to the amplitude or stroke of the oscillating movement of the cable. This procedure can be repeated for a given number of times.

In general the distance for which the particular seat has to be moved will not be a multiple of the selected amplitude. In this case the control device will only perform a certain number of steps or strokes such that the number of steps times the stroke is less than the distance of desired movement. Then the control device selects a new, lower amplitude or stroke which is chosen such that the remaining distance for the seat to be moved is a multiple of the new amplitude. This is indicated in the lower part of FIG. 5 which includes a second curve for z(t), wherein the amplitude of the reciprocating movement of the cable has been reduced to one fifth. For example the amplitude is in the first steps 5 cm; in this phase the seat to be move is coupled for given number of times to the cable such that steps of one stroke at a time are subsequently made. After a given number of such incremental movements in strokes of 5 cm in this example, the amplitude is lowered as shown in the lower part of the FIG. 5, and a given number of steps of 1 cm is made. If, for example, the total distance of movement for a particular seat is 42 cm and if an amplitude of 5 cm is used, there could be 8 subsequent coupling intervals each with an incremental movement of 5 cm, whereafter the amplitude is lowered to 1 cm and two further incremental movements of 1 cm are performed to complete the full distance.

In order to provide an independent position determination for each seat, each leg that is provided with a locking and coupling mechanism is further equipped with an optical sensor which allows to sense the attachment holes 5 and to determine the number of attachment holes passed during the movement along the seat track; in this manner the actually travelled distance can be compared to the desired distance in the control device, and if any noticeable deviation should be determined the incremental movements of the seat leg can be adapted by the control device such that the desired distance and actually travelled distance coincide. By independently carrying out this comparison and adaption any miss-alignment of the seat on the seat track or any distortion of the seat tracks can be taken into account and compensated. Furthermore, by adapting the movement of the seat with respect to the positions of the attachment holes 5 it is furthermore ensured that the seat reaches a final position in which the locking mechanism of the seat leg is in alignment with the attachment holes that correspond to the desired final position. In this connection it should of course be understood that the pattern of desired position includes positions only that correspond to positions in exact alignment to the attachment holes of the final position, i.e. positions can only be changed in incremental units determined by the distance between attachment holes.

In principle it would also be possible to define coupling intervals which are not extending between following turning points of the reciprocating movement. However, this adaption of the coupling intervals to the period of the oscillating movement is advantages in that the coupling to the cable takes place at a point in time when the cable is at rest; therefore any undefined state of slipping between cable and the clamping bodies on the clutch are avoided. Furthermore, by performing the decoupling form the cable at the next turning point of the reciprocating movement when the cable is again at rest has the advantage that the seat is stopped by the stopping cable and then decoupled therefrom in a well defined position.

As indicated above the time dependence or shape of the reciprocating movement function is arbitrary; in principle, if only full stroke movement increments are made, as described for the preferred embodiments, only the stroke length and the number of strokes eventually determine the total movement which is the sum over each of the strokes or steps. The control device can be adapted with algorisms which select stroke and frequency of the movement and a number of coupling intervals, wherein the stroke value may be changed once or several times in order to bring the total movement as the sum of incremental movements to the desired distance for each seat row.

The invention claimed is:

1. Method for adapting a seat row arrangement in an airplane according to a currently desired pattern of seat row positions in a longitudinal direction over a passenger cabin of the airplane in order to set seat row distances, if appropriate differing in some sections of the cabin, wherein the currently desired pattern of seat row positions is stored in a control device and wherein the seat rows are mounted on seat tracks extending in the longitudinal direction and locked therein against longitudinal movements by a locking mechanism associated with each seat row, the method comprising the following steps, each performed automatically by the control device:

(a) unlocking, under control of the control device, a seat row whose position is to be changed from a first position to a second position in order to obtain the currently desired pattern of seat row positions by releasing the locking mechanism for the seat row, (b) coupling, at least one cable to the seat row, the at least one cable extending in the longitudinal direction along the cabin and being driven by a motor to move back and forth in a manner controlled by the control device, (c) after step (b), driving the cable forth by a fraction of a total distance between the first position and the second position, said fraction determined by said control device,
(d) after step (c), releasing the seat row from the at least one cable,
(e) after step (d), driving the cable back, and then
(f) repeating steps (b)-(e) until a sum of the fractions equals the total distance between the first position and the second position, thereby moving the seat row on the seat tracks of the seat row to the second position by operating drive means under the control of the control device, and
(g) locking the seat row against longitudinal movement on the seat tracks by the control device by actuating the locking mechanism.

2. Method according to claim 1, wherein for each seat row to be moved, the fractions are adjusted by the control device in such a manner that starting and end points in time of each fraction correspond to a point in time in which the cable is at rest.

3. Method according claim 2, wherein for each seat row to be moved, the cables for driving the seat row are driven to perform a periodical, oscillating back and forth movement with a variable amplitude and frequency which is selected by the control device such that the sum of the amplitudes over the coupling periods results in the desired distance of movement to the position of the seat row according to the desired pattern of positions.

4. Method according to claim 1, wherein for each seat track, a cable is provided which is driven to move back and forth in the seat track, and wherein for each leg of a seat row that is slidably mounted on one of the seat tracks, the locking mechanism for locking and unlocking the seat leg on the seat track against longitudinal movements is provided.

5. Method according to claim 4, wherein for each locking mechanism, the position of the locking mechanism relative to attachment holes in the seat track is sensed and transmitted to the control device, wherein the control device is adapted to determine whether the locking mechanism is in alignment with attachment holes corresponding to a final position of the seat leg according to the desired pattern of seat row positions, and wherein the control device upon receipt of the signal indicating the alignment, actuates the locking mechanism to lock the seat leg on the seat track.

6. Method according to claim 1, wherein the releasing of the locking mechanism to unlock a seat leg from the associated seat track is effected by moving a clutch body upward such that pins projecting from the lower surface of the clutch body are moved out of engagement with the attachment holes on the seat track, wherein the upward movement of the clutch body at the same time causes a coupling engagement with the reciprocating cable by moving clamping bodies attached to the clutch body into engagement with the cable, and wherein opposing one of the clamping bodies engage and clamp the cable between each other.

7. Method according to claim 1, wherein a signal exchange between the control device on one hand and the motor for driving the cable, the locking mechanisms and coupling mechanisms on the other hand is effected by wireless radio transmission of signals.

8. Method according to claim 1, wherein the control device is adapted such that the number of seat rows which are coupled at the same time to the cable to be moved thereby is limited to a predetermined threshold.

9. System for adapting a seat row arrangement in an airplane according to a currently desired pattern of seat row positions in the longitudinal direction over a passenger cabin of the airplane in order to set seat row distances, the system comprising:
a control device,
a plurality of seat rows mounted on seat tracks longitudinally extending in a cabin floor of the passenger cabin, wherein each leg of a seat row is mounted on a seat track having a locking mechanism capable of unlocking and locking the seat leg against longitudinal movements in the seat track, a cable driven by drive means for a reciprocating movement in the longitudinal direction,
at least one coupling mechanism associated with each seat row for selective coupling of the seat row to the cable under the control of the control device, wherein the control device is structured and programmed to carry out steps of:
(a) unlocking a seat row whose position is to be changed from a first position to a second position in order to obtain the currently desired pattern of seat row positions by releasing the locking mechanism for the seat row,
(b) coupling at least one cable to the seat row, the at least one cable extending in the longitudinal direction along the cabin and being driven by a motor to move back and forth in a manner controlled by the control device,
(c) after step (b), driving the cable forth by a fraction of a total distance between the first position and the second position, said fraction determined by said control device,
(d) after step (c), releasing the seat row from the at least one cable,
(e) after step (d), driving the cable back, and then
(f) repeating steps (b)-(e) until a sum of the fractions equals the total distance between the first position and the second position, thereby moving the seat row on its seat tracks to the second position by operating drive means, and
(g) locking the seat row against longitudinal movement on the seat tracks by actuating the locking mechanism.

10. System according to claim 9, wherein each locking mechanism includes a clutch body having pins projecting from its lower surface, which pins are arranged to be engageable with attachment holes disposed along each seat track, the clutch body being mounted to be moveable in vertical direction up and down to move the pins out of or into engagement with the attachment holes to thereby unlock or lock the associated seat leg in the seat track, the clutch body further being equipped with clamping members arranged in relation to the associated cable such that the clamping members are out of coupling engagement with the cable when the clutch body of the locking mechanism is in its locked position on the seat track, and such that the clamping members are in coupling engagement with the cable when the clutch body is moved upward to an unlocked position with its pins out of engagement with the attachment holes.

11. System according to claim 9, wherein the drive means include at least one linear electric motor at the front end of the cabin and one linear electric motor at the backward end of the cabin, wherein the cables extend in longitudinal direction between the motors and are driveable for a reciprocating movement by the two motors.

12. System according to claim 9, wherein each locking mechanism on a driven seat leg is provided with an optical sensor which delivers sensing signals to the control device which allow the control device to determine the locations of the attachment holes within the seat track.

* * * * *